UNITED STATES PATENT OFFICE.

AUGUSTE J. ROSSI, OF NEW YORK, N. Y., ASSIGNOR TO GEORGE H. ROBINSON, OF SAME PLACE.

PRODUCTION OF COLD.

SPECIFICATION forming part of Letters Patent No. 332,751, dated December 22, 1885.

Application filed June 27, 1885. Serial No. 169,933. (No specimens.)

*To all whom it may concern:*

Be it known that I, AUGUSTE J. ROSSI, of the city of New York, in the State of New York, have invented a new and useful Improvement in the Production of Cold, which is set forth in the following specification.

In the development of the original method of producing cold invented by C. M. Tessié du Motay and myself, and set forth in Patent No. 224,246, of February 3, 1880, I have discovered that the use of carbonic acid or carbon dioxide ($CO_2$) as the absorbed substance affords a binary liquid possessing new and different properties and advantages from the solution of anhydrous sulphurous oxide ($SO_2$) or ammonia in sulphuric ether, which are of increased value and importance in the production of cold.

I have found that sulphuric ether of .720 to .725 specific gravity at a temperature of about 70° Fahrenheit will dissolve from two to three per centum of its weight of anhydrous carbonic acid at atmospheric pressure, the solubility increasing as the pressure increases.

It is known that carbonic-acid gas can be liquefied under a pressure of seventy-five to eighty atmospheres, and that this liquid boils at about 102° Fahrenheit below zero. Manifestly it would be objectionable in practice to attempt to employ this liquefied gas alone for the production of cold; but all objections are overcome and great advantages attained by the use of carbonic acid dissolved in a suitable absorbent. The boiling-point of the binary liquid is greatly lowered by the use of carbonic acid as the absorbed element in place of sulphurous acid or ammonia, and thus an increased cooling effect is obtained. The boiling-point of anhydrous sulphurous acid is about 14° Fahrenheit; that of ammonia is about 20° Fahrenheit below zero; that of sulphuric ether is about 95° Fahrenheit, and the boiling-point of the binary liquid formed by using ether as the absorbent is reduced under the same conditions in proportion as the boiling-point of the absorbed gas is lower.

The pressure required in practice to liquefy the vapor and form anew the binary liquid in the condenser is less where carbonic acid is used as the absorbed gas than where anhydrous sulphurous acid or ammonia is used, and thus a saving of power is effected in producing cold. The pressure in the refrigerator is also less, and consequently the apparatus required for performing the process may be more economically constructed and used. By saturating sulphuric ether under pressure the amount of carbonic acid absorbed is greatly increased and the binary liquid thus formed has a much greater cooling effect than the liquid obtained by the use of sulphurous acid or ammonia, while the pressure can be kept within a moderate limit and not practically higher than in the case of either of the latter binary liquids.

The use of the binary liquid composed of ether and ammonia requires that the apparatus should be made of iron, on account of the action of ammonia on copper, which is the preferable material; but when carbonic acid is the absorbed gas copper can be used without deterioration for the construction of the apparatus.

Anhydrous sulphurous acid is liable in practice, by coming in contact with water, to be changed into sulphuric acid, which is corrosive and injurious to the metal of the apparatus.

It is true that when anhydrous sulphurous acid is dissolved in sulphuric ether this liability to corrosion is considerably diminished; but by the use of carbon dioxide as the absorbed element all possible danger of corrosion is removed, as the presence of water would only produce carbonic acid, which has no corrosive action whatever.

As the cost of carbonic acid is trifling—not more than five cents a pound—the binary liquid formed by its use may be employed with great economy.

I introduce the carbonic-acid gas perfectly dry, obtained by any approved method, into the carboy or other suitable receptacle provided with a pressure-gage and containing concentrated sulphuric ether, which absorbs the carbonic acid. This is continued until the ether is saturated at atmospheric pressure, or at higher pressure, if desired, as indicated by the gage. The quantity of carbonic acid absorbed by the ether will vary with the pressure and temperature at which the absorption is effected. The machine employed for producing cold is then charged with this binary liquid.

Another mode of making the liquid is to charge the machine first with the ether and then pass a current of dry carbonic acid into the refrigerator containing the ether, which is provided with a pressure-gage.

The machine which I employ is provided with a refrigerator in which the cooling-liquid is introduced, a condenser in which the vapor of the absorbent is liquefied and reabsorbs the carbonic acid, the heat of liquefaction and absorption being carried away by the circulation of cold water around the condenser, and with a double-acting pump connected with the refrigerator and condenser, by the action of which the vapor of the binary liquid is aspirated from the refrigerator, and the binary liquid is then reconstituted in the condenser and flows back through a pipe to the refrigerator, to be evaporated again, and so on continuously.

What I claim as new, and desire to secure by Letters Patent, is—

The use of carbonic acid combined with sulphuric ether for producing cold, substantially as described.

AUGUSTE J. ROSSI.

Witnesses.
E. S. INNET,
W. A. BLANEY.